US006018146A

United States Patent [19]

Uzgiris et al.

[11] Patent Number: 6,018,146

[45] Date of Patent: Jan. 25, 2000

[54] RADIANT OVEN

[75] Inventors: Egidijus Edward Uzgiris, Niskayuna; John Frederick Ackerman, Cheyenne; Robert David Lillquist, Niskayuna, all of N.Y.

[73] Assignee: General Electric Company, Schenectady, N.Y.

[21] Appl. No.: 09/221,482

[22] Filed: Dec. 28, 1998

[51] Int. Cl.[7] .................... A21B 1/00

[52] U.S. Cl. .................... 219/405; 219/411; 219/553; 313/112

[58] Field of Search .................... 219/391, 405, 219/411–413, 492, 494, 553; 99/326, 331, 386, 443 C; 362/92; 392/407, 708, 411; 250/503.1; 313/112

[56] References Cited

U.S. PATENT DOCUMENTS

| | | | |
|---|---|---|---|
| 4,421,015 | 12/1983 | Masters et al. | 99/332 |
| 4,426,570 | 1/1984 | Hikino et al. | 219/354 |
| 5,036,179 | 7/1991 | Westerberg | 219/411 |
| 5,517,005 | 5/1996 | Westerberg et al. | 219/685 |
| 5,627,426 | 5/1997 | Whitman et al. | 313/116 |
| 5,786,569 | 7/1998 | Westerberg | 219/411 |

*Primary Examiner*—Mark Paschall
*Assistant Examiner*—Shawntina Fuqua
*Attorney, Agent, or Firm*—David C. Goldman; Jill M. Breedlove

[57] ABSTRACT

Cooking speed and efficiency are increased in radiant ovens by reducing the intensity of energy emitted by the oven's radiant energy source that does not deeply penetrate food. Undesired photochemical reactions in the cooked food are also reduced or eliminated. In one embodiment, the radiant energy source includes at least one lamp having a coating that reflects at least some of the radiant energy that does not deeply penetrate food. In another embodiment, a plate that reflects or absorbs at least some of the radiant energy that does not deeply penetrate food is disposed between the radiant energy source and a location within the oven where food to be cooked is placed.

14 Claims, 3 Drawing Sheets

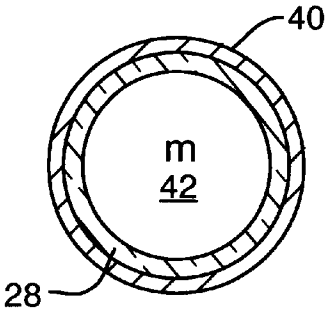
FIG. 4
FIG. 5
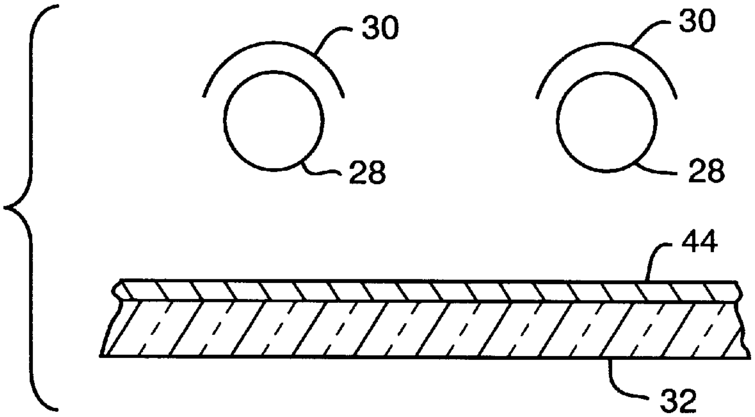
FIG. 6
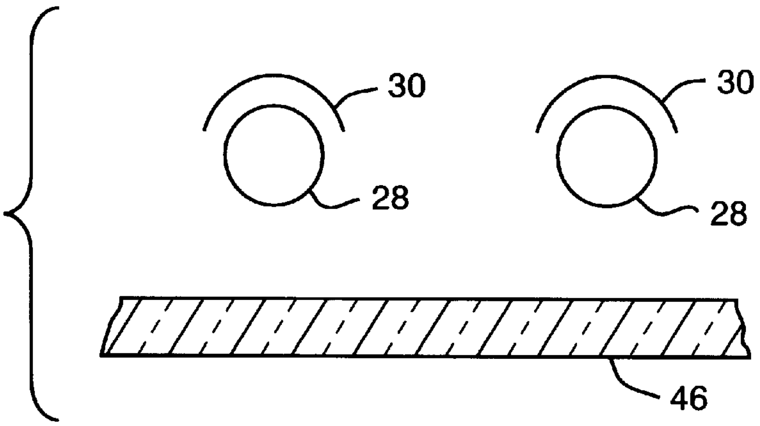

RADIANT OVEN

BACKGROUND OF THE INVENTION

This invention relates generally to radiant ovens and more particularly to radiant ovens having increased cooking speed and efficiency while minimizing photochemical reactions in the cooked food.

Radiant ovens have been used to achieve higher cooking speed as compared to conventional ovens while maintaining a high food quality in an energy efficient manner. Such radiant ovens typically include a cooking chamber having highly reflective inner walls and a rack or the like within the cooking chamber upon which food items can be placed. Radiant ovens also include a means for producing radiant energy in the cooking chamber. Typically, the radiant energy means is an array of high-power lamps such as quartz-halogen lamps or quartz arc lamps. The lamps, which are ordinarily placed above and below the rack, radiate energy in all directions. A portion of the energy will radiate directly onto the food item, and the remainder of the energy will be reflected off of the inner walls of the chamber and then strike the food item for more efficient cooking. Sometimes, curved reflectors are placed behind the lamps so as to concentrate reflected energy onto the food item.

Typical quartz-halogen lamps convert electrical energy into radiation that follows a black body spectral distribution with a peak intensity at about 1 $\mu$m wavelength. It is believed that the cooking action in most foods is primarily by absorption of so-called near infrared radiation, which is radiation having a wavelength in the range of about 1 $\mu$m to 2.5 $\mu$m. Radiation having somewhat longer wavelengths (sometimes referred to as the far infrared region) does not penetrate deeply into foodstuffs, but can be useful for the surface browning of foods. It is generally believed that radiation with wavelengths shorter than 1 $\mu$m is not of much value in cooking processes, partly because of the weaker interaction of the shorter wavelengths with the food molecules, and partly because of the inferior food penetrating capability of such radiation. In particular, it is believed that visible light, i.e., radiation with a wavelength in the range of about 300 nm to 700 nm, is not very useful in cooking processes. In a typical radiant oven, the fraction of radiant energy in the visible light range that impinges on the foodstuff is approximately 10 to 15% of the total energy emitted to 2.5 $\mu$m. Thus, although conventional radiant ovens are generally energy efficient as compared to most other cooking modalities, efficiency does suffer because a significant portion of the radiant energy impinging on the food contributes little to the cooking of the food.

Moreover, a portion of the visible spectrum is believed to be responsible in initiating undesired photochemical reactions in foodstuff through a nonlinear absorption process for foodstuff having UV absorption bands in the 250 nm to 290 nm range, a range which is common to all proteins. Because of the high intensity of the lamps, it is possible for food molecules to achieve an electrically excited state in which the molecules can emit heat, fluoresce, or undergo intersystem crossing and the breaking of a bond. Although the probability of bond rupture is relatively low, the consequences are that free radicals (unpaired electrons on the molecular product fragments) are produced each time a molecule undergoes such excited state deactivation. Since free radicals are very reactive with other molecules, this can lead to the possibility of considerable chemical changes in foodstuffs cooked in a conventional radiant oven, including the loss of food nutrients and the formation of undesired products. The critical spectral component of this free radical formation process falls in the visible spectrum.

Speed of cooking is another factor that differentiates radiant ovens from conventional cooking, and even greater cooking speeds would be advantageous. Yet, cooking speed does not necessarily increase with increased energy flux. This is because, as mentioned above, a large portion of the lamp power does not penetrate far into the surface of the food. If the influx of radiant energy is very much higher than the rate of thermal diffusion in from the surface, the food will char and burn at the surface. The charring starts a cycle that further prevents energy penetration into the interior. The result is a food that is badly burned at the surface and unacceptable in quality. Thus, simply increasing energy flux is not an effective approach to increasing cooking speed. A further practical limitation arises in that the amount of available radiant energy in a standard oven design is limited by the maximum capacity of an ordinary household electrical power circuit, which is 18 kW.

Finally, because of the high rate of surface heating in conventional radiant ovens, the cook times and power levels of the lamps are very sensitive to food type, size and placement in the oven.

Accordingly, there is a need for a radiant oven that cooks food faster without burning, is more efficient, has more robust cooking control, and avoids undesired photochemical reactions.

SUMMARY OF THE INVENTION

The above-mentioned needs are met by the present invention which reduces radiant energy in spectral regions that do not deeply penetrate foodstuffs (which includes the component of the visible spectrum that is photochemically active) and transfers that energy to the near infrared region, thereby increasing cooking speed and efficiency while minimizing photochemical reactions in the food. Specifically, the present invention provides a radiant oven having a cooking chamber and a radiant energy source arranged to direct radiant energy into the cooking chamber. The radiant oven also includes one or more elements that reduce the intensity of energy emitted by the radiant energy source that does not deeply penetrate food. In one embodiment, the radiant energy source comprises at least one lamp having a coating that reflects at least some of the radiant energy that does not deeply penetrate food. In another embodiment, a plate that reflects or absorbs at least some of the radiant energy that does not deeply penetrate food is disposed between the radiant energy source and a location within the cooking chamber where food to be cooked is placed.

Other objects and advantages of the present invention will become apparent upon reading the following detailed description and the appended claims with reference to the accompanying drawings.

DESCRIPTION OF THE DRAWINGS

The subject matter which is regarded as the invention is particularly pointed out and distinctly claimed in the concluding part of the specification. The invention, however, may be best understood by reference to the following description taken in conjunction with the accompanying drawing figures in which:

FIG. 4 is a partial sectional view showing a first embodiment of the present invention.

FIG. 5 is a partial sectional view showing a second embodiment of the present invention.

FIG. 6 is a partial sectional view showing a third embodiment of the present invention.

DETAILED DESCRIPTION OF THE INVENTION

Figure 1:
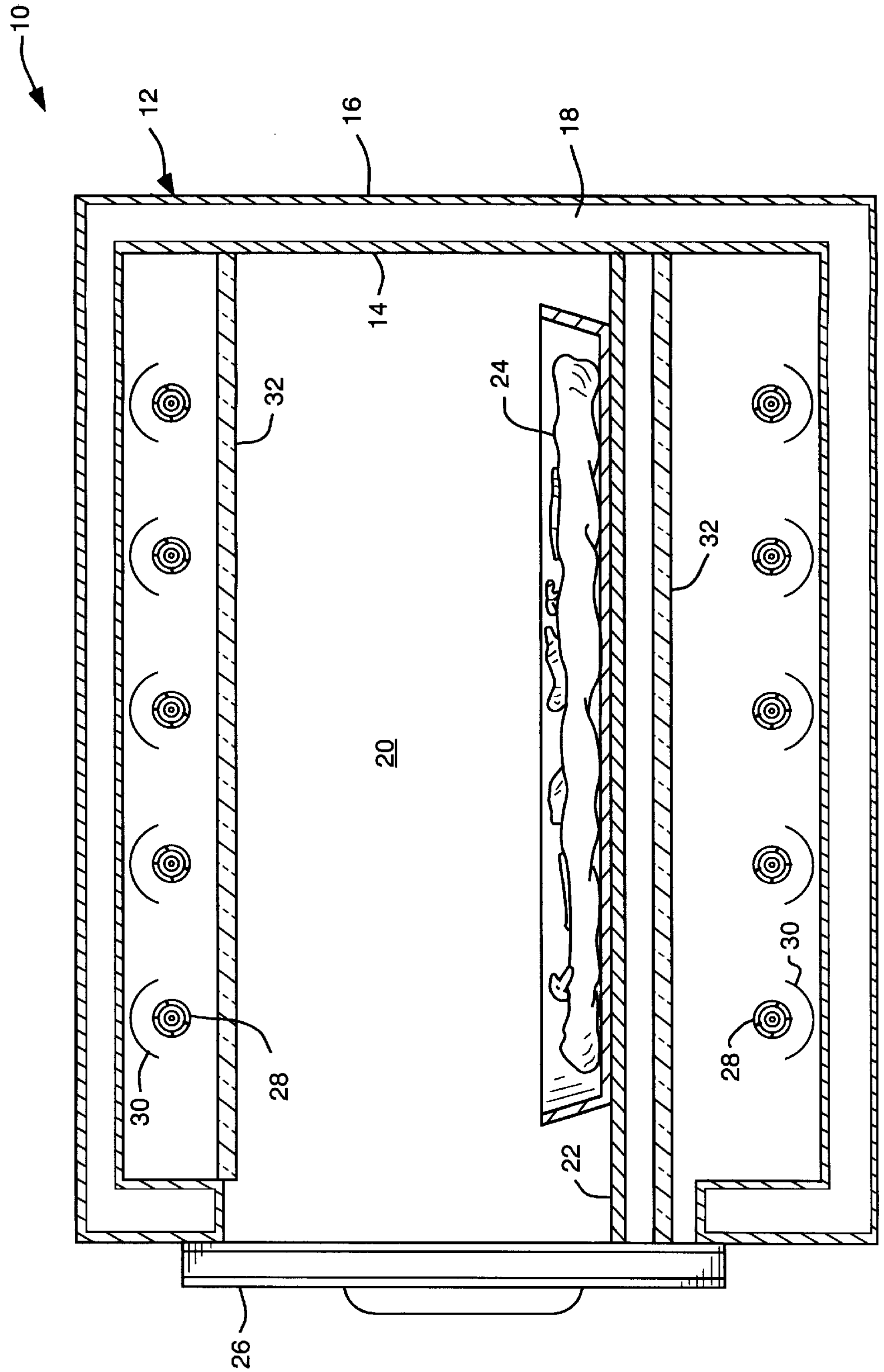
FIG. 1 (PRIOR ART)
FIG. 1 is a sectional view of a conventional radiant oven.

Referring to the drawings wherein identical reference numerals denote the same elements throughout the various views, FIG. 1 shows a conventional radiant oven 10. Radiant oven 10 includes an outer enclosure 12. Enclosure 12 has an inner wall 14 coupled to an outer wall 16. An insulating layer 18, which can be a layer of air, is formed between the inner and outer walls 14 and 16. Inner wall 14, which is typically a highly reflective surface, defines a cooking chamber 20. A rack 22 for supporting a food item 24 is disposed within cooking chamber 20. A door 26 is provided on one side of enclosure 12 for providing access to cooking chamber 20.

The energy for cooking food item 24 is supplied by a plurality of high power heating lamps 28 disposed in cooking chamber 20; typically, half of the lamps 28 are located in an upper portion of cooking chamber 20, and the other half of the lamps 28 are located in a lower portion of cooking chamber 20. Lamps 28 are generally any of the quartz body, tungsten-halogen lamps that are commercially available. One preferred type of lamp is a 1.5 kW, 208 V quartz-halogen lamp. Heating lamps 28 radiate energy in all directions. A portion of this energy will radiate directly onto food item 24, and a reflector 30 is placed behind each lamp 28 to reflect additional radiation onto food item 24. Two radiation transparent plates 32 are used to isolate heating lamps 28 from the rest of the cooking chamber 20. Plates 32 can be formed from any suitable material, such as quartz or glass, which transmits a high degree of the visible and infrared radiation emitted by lamps 28.

Speed of cooking in radiant ovens is highly dependent on how deeply the radiant energy from the oven's energy sources penetrates into the surface of the food. The penetration depth of radiant energy in several foods as a function of wavelength was measured by placing food samples of various types and thicknesses in an integrating sphere and recording the total non-absorbed light for each sample. For wavelengths longer than 1200 nm, the measured penetration depth was very short, on the order of 2 mm. However, penetration depth in the band from about 700 nm (the exact low end of the band is somewhat dependent on food type) to 1200 nm was considerably greater. This band had an average penetration depth of some 1 to 2 cm, whereas the remainder of the spectrum penetrates some 5 to 10 times less. Thus, the spectral band of about 700–1200 nm is believed to be most effective at cooking foods quickly without burning.

Figure 2:
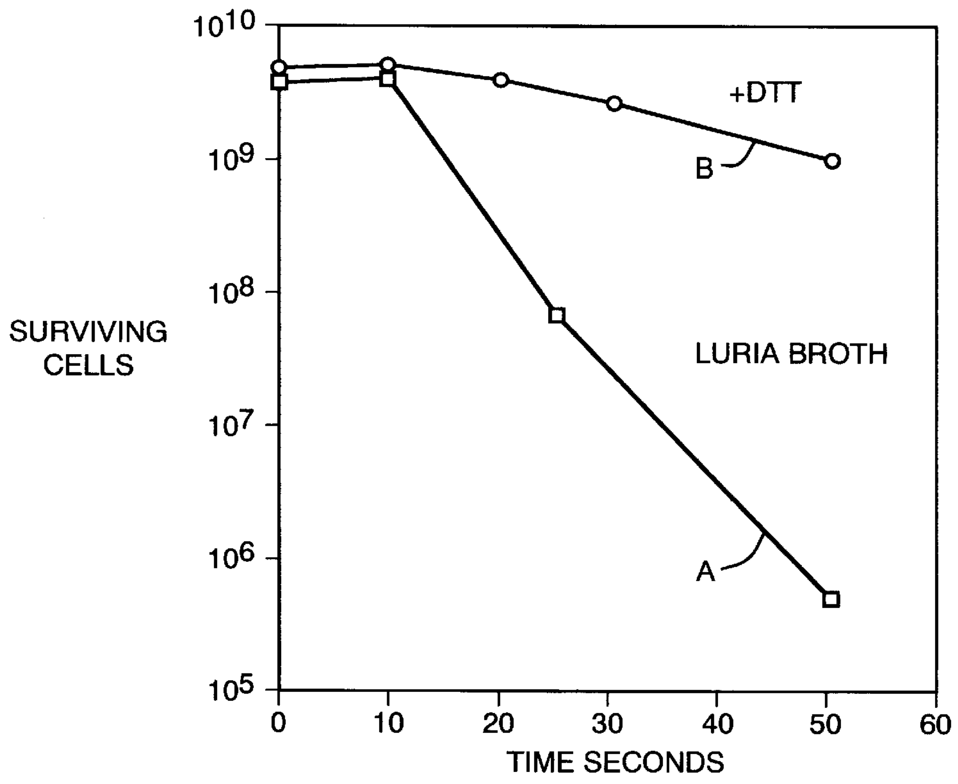
FIG. 2 is a plot showing the number of surviving cells as a function of time for two different samples.

As mentioned above, a portion of the visible spectrum is believed to cause undesired photochemical reactions in foodstuff by producing free radicals. Free radical formation in oven irradiated material can be observed by their action on living cells. Free radicals in living systems are lethal and the presence of free radicals in a medium containing living cells would result in cell destruction, which can be monitored with good sensitivity. To demonstrate this principle, small samples of bacterial suspensions were illuminated in a conventional radiant oven for short periods of time with and without a free radical scavenger. The results are shown in FIG. 2 which plots the number of surviving cells as a function of time. Curve A represents cells in a Luria media only, and curve B represents cells in a Luria media plus DTT (dithiothreitol, $HSCH_2CH(OH)CH(OH)CH_2SH$), which is a free radical scavenger. The SH groups in the DTT interact with any free radicals, and thus the DTT can act as a sink for free radicals, or, at the very least, it can slow down harmful reactions by interacting with the free radicals before they come into contact with crucial cell enzymes or cell DNA. As seen in FIG. 2, the amount of surviving cells is considerably higher in curve B, the sample including DTT. Thus, the amount of surviving cells is an indication of free radical formation.

Figure 3:
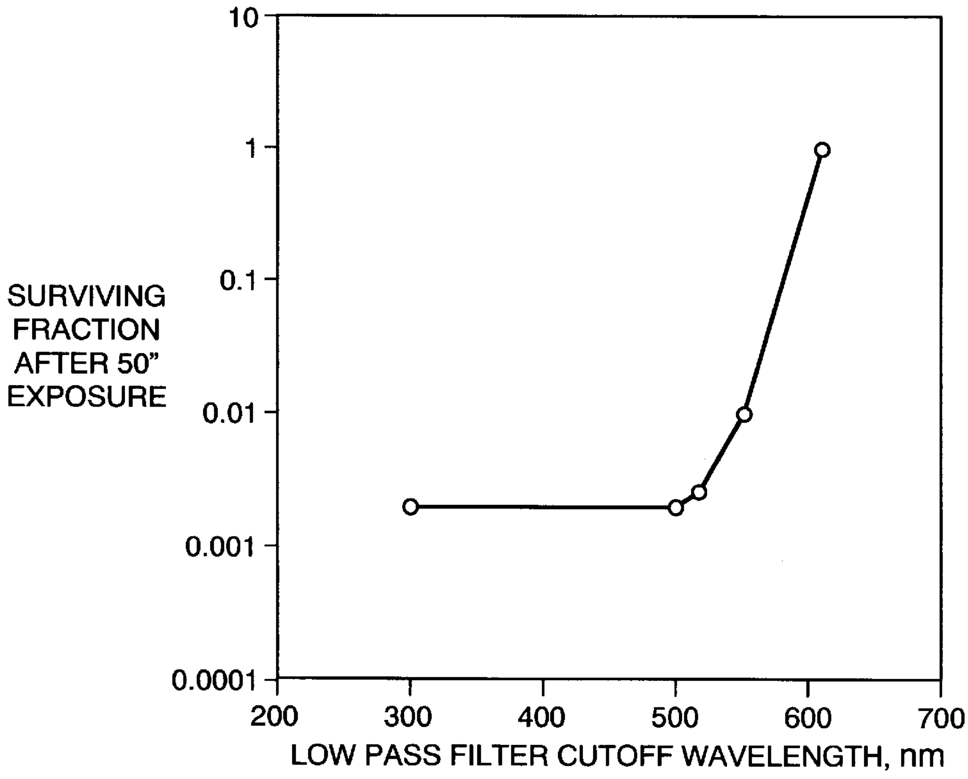
FIG. 3 is a plot showing fractional cell survival as a function of wavelength of the illuminating radiation.

FIG. 3 shows a plot of fractional cell survival as a function of wavelength of the illuminating radiation. Here, samples were illuminated in a conventional radiant oven for a predetermined period of time. Low pass filters were used to collect data points at different wavelengths. FIG. 3 shows that the active spectral component of the illuminating radiation lies between 500 nm and 600 nm and more particularly between 550 nm and 600 nm. Thus, the process of free radical formation in foodstuffs could be eliminated by reducing the intensity of the visible light in the wavelength band of 500 nm and 600 nm and particularly between 550 nm and 600 nm. Since the formation process is very non-linear (as shown in FIG. 3), a reduction in this band of even a factor of two might be sufficient for elimination of photochemical reactions.

Turning to FIG. 4, a first embodiment of the present invention is shown. FIG. 4 shows one heating lamp 28 used in a radiant oven such as the one shown in FIG. 1, although the present invention would be applicable to virtually any oven design using heating lamps. In this embodiment, each heating lamp 28 is provided on its outer surface with a coating 40 that reduces the intensity of radiant energy which does not deeply penetrate food, i.e., radiation outside of the spectral band of about 700–1200 nm, by reflecting at least some of that energy. In doing so, coating 40 also reduces the visible radiation that contributes to photochemical reactions. Thus, the reflected radiation would be prevented from impinging on food item 24 (thereby minimizing or even eliminating photochemical reactions), and the radiation impinging on the food item 24 would be primarily or entirely deep penetrating radiation in the spectral band of 700–1200 nm SO as to decrease cooking times. This would also result in a more robust cooking performance for a large variety of foods because the energy deposition would be more evenly distributed throughout food item 24. Furthermore, the cooking efficiency of the radiant oven is increased because the reflected radiation, which is not useful in cooking anyway, is reflected back onto the lamp filament 42, some of which would then be re-radiated as radiation in the spectral band of 700–1200 nm.

In a first alternative, coating 40 is a multilayer, dielectric thin film coating made up of alternating layers of a relatively high refractive index material and a relatively low refractive index material selected so as to provide a thin film interference filter that transmits radiation in the spectral band of about 700–1200 nm and reflects all other radiation. One example of a suitable interference filter uses tantalum oxide ($Ta_2O_5$) as the high index material (H) and silicon dioxide ($SiO_2$) as the low index material (L). The thicknesses (in nm) of the alternating layers would be as follows:

| | | |
|---|---|---|
| 1) | 42.78 | H |
| 2) | 81.89 | L |
| 3) | 59.35 | H |

-continued

| | | |
|---|---|---|
| 4) | 96.6 | L |
| 5) | 60.61 | H |
| 6) | 99.95 | L |
| 7) | 75.10 | H |
| 8) | 97.49 | L |
| 9) | 44.96 | H |
| 10) | 166.3 | L |
| 11) | 225.95 | H |
| 12) | 205.103 | L |
| 13) | 190.38 | H |
| 14) | 252.86 | L |
| 15) | 166.30 | H |
| 16) | 254.33 | L |
| 17) | 222.21 | H |
| 18) | 101.73 | L |
| 19) | 36.78 | H |

In a second alternative, coating 40 is a multilayer, dielectric thin film coating configured as a "cold mirror" coating that reflects radiation below a certain wavelength (i.e., the reflectance edge) and passes radiation above the reflectance edge. The reflectance edge of coating 40 can be adjusted to any value, and would preferably be set at about 600 nm so that the active visible wavelength band of 500–600 nm would be eliminated. Alternatively, the reflectance edge can be set at about 700 nm so as to block all visible light. This would maximize the energy reflected onto the lamp filament, thereby maximizing the increase in cooking efficiency. This second alternative for coating 40 is primarily beneficial in eliminating photochemical reactions and increasing efficiency. This alternative would not be as useful in increasing cooking speed as the first alternative because the low penetrating radiation above 1200 nm would still impinge on food item 24.

One example of a suitable cold mirror coating having a reflectance edge of 600 nm also uses tantalum oxide ($Ta_2O_5$) as the high index material (H) and silicon dioxide ($SiO_2$) as the low index material (L). In this case, the thicknesses (in nm) of the alternating layers would be as follows:

| | | |
|---|---|---|
| 1) | 62.7 | H |
| 2) | 96.2 | L |
| 3) | 61.0 | H |
| 4) | 95.4 | L |
| 5) | 62.2 | H |
| 6) | 95.3 | L |
| 7) | 64.7 | H |
| 8) | 91.8 | L |
| 9) | 65.3 | H |
| 10) | 91.9 | L |
| 11) | 64.2 | H |
| 12) | 92.5 | L |
| 13) | 64.5 | H |
| 14) | 94.1 | L |
| 15) | 63.6 | H |
| 16) | 94.4 | L |
| 17) | 64.7 | H |
| 18) | 91.5 | L |
| 19) | 64.3 | H |

In a third alternative, coating 40 is a multilayer, dielectric thin film coating configured as a "notch" coating that reflects a specific band of radiation and passes radiation of all other wavelengths. With this type of coating, the reflectance band could be set to match the active visible wavelength band of 500–600 nm. A notch coating has the advantage over the cold mirror coating in that it would preserve more of the visible spectrum, a benefit in that visibility of food from outside of the oven would be enhanced. On the other hand, such a notch coating would not increase cooking efficiency as much as the cold mirror coating because less energy is reflected back onto lamp filament 42. And like the cold mirror coating, the notch coating would primarily function to eliminate photochemical reactions. It would not increase efficiency or improve cooking speed as well as the first alternative. One example of a suitable notch coating that would eliminate the 500–600 nm band would use 24 alternating layers of 90.6 nm of alumina and 145 nm of silica (for a subtotal of 48 layers) and one final layer of 90.6 nm of alumina.

FIG. 5 shows a second embodiment of the present invention. In this embodiment, each transparent plate 32 is provided on its flat surface facing heating lamps 28 with a coating 44 that reduces the intensity of radiant energy which does not deeply penetrate food, i.e., radiation outside of the spectral band of about 700–1200 nm, by reflecting at least some of that energy. Alternatively, coating 44 could be disposed on the other flat surface of transparent plate 32 or on both of flat surfaces. As is the first embodiment, use of coating 44 prevents at least some of the radiation that tends to char food and initiate photochemical reactions from impinging on food item.

Coating 44 can be any one of the three alternatives described above in connection with lamp coating 40. That is, coating 44 is a multilayer, dielectric thin film coating made up of alternating layers of a relatively high refractive index material and a relatively low refractive index material. The layers are selected so as to provide either a thin film interference filter that transmits radiation in the spectral band of about 700–1200 nm and reflects all other radiation, a "cold mirror" coating that reflects radiation below a reflectance edge (preferably set at about 600 nm or 700 nm) and passes radiation above the reflectance edge, or a "notch" coating that reflects a specific band of radiation (preferably 500–600 nm) and passes radiation of all other wavelengths. The same examples given for the first embodiment would be applicable for this embodiment.

This embodiment provides an advantage over the first embodiment in that it is generally easier to apply such coatings to a flat surface than a curved surface. Thus, production costs would be less. However, this embodiment would not provide as large of an increase in cooking efficiency because the radiation that is not transmitted is not reflected directly onto the lamp filaments.

FIG. 6 shows a third embodiment of the present invention. In this embodiment, each of the conventional transparent plates 32 are replaced with a modified transparent plate 46. Transparent plates 46 are made of infrared pass glass, i.e., material that passes infrared radiation but absorbs visible light. Thus, undesirable visible light can be prevented from impinging on food item 24. Suitable infrared pass glasses are commercially available from Hoya Optics. The absorption edge of plate 46 can be adjusted to any value, and would preferably be set at about 600 nm so that the active visible wavelength band of 500–600 nm would be eliminated. Alternatively, the absorption edge can be set at about 700 nm so as to block all visible light. The modified plates 46 are a simple and relatively inexpensive approach, but they do not provide an efficiency benefit in that the unused energy is absorbed. This absorption also creates a heat load on the plates 46.

The foregoing has described a radiant oven having increased cooking speed and efficiency while reducing or eliminating photochemical reactions in the cooked food. While specific embodiments of the present invention have been described, it will be apparent to those skilled in the art that various modifications thereto can be made without departing from the spirit and scope of the invention as defined in the appended claims.

What is claimed is:

1. A radiant oven comprising:

a cooking chamber;

a radiant energy source, which comprises at least one lamp disposed in said cooking chamber, arranged to direct radiant energy into said cooking chamber, said radiant energy including energy that does not deeply penetrate food; and means for reducing the intensity of said radiant energy that does not deeply penetrate food, comprises a coating that reflects said radiant energy back onto the lamp;

said coating reflects said radiant energy having a wavelength below the range of 700–1200 nm.

2. The radiant oven of claim 1 wherein said coating reflects radiation having a wavelength below about 600 nm.

3. The radiant oven of claim 1 wherein said coating reflects radiation having a wavelength below about 700 nm.

4. The radiant oven of claim 1 wherein said coating reflects radiation having a wavelength in the range of about 500–600 nm.

5. The radiant oven of claim 1 wherein said coating is a multilayer, dielectric thin film coating.

6. The radiant oven of claim 1 wherein said means for reducing the intensity of said radiant energy that does not deeply penetrate food comprises a plate disposed between said radiant energy source and a location within said cooking chamber where food to be cooked is placed and a coating that reflects at least some of said radiant energy that does not deeply penetrate food formed on said plate.

7. The radiant oven of claim 6 wherein said coating reflects radiation having a wavelength below the range of 700–1200 nm.

8. The radiant oven of claim 6 wherein said coating reflects radiation having a wavelength below about 600 nm.

9. The radiant oven of claim 6 wherein said coating reflects radiation having a wavelength below about 700 nm.

10. The radiant oven of claim 6 wherein said coating reflects radiation having a wavelength in the range of about 500–600 nm.

11. The radiant oven of claim 6 wherein said coating is a multilayer, dielectric thin film coating.

12. The radiant oven of claim 1 wherein said means for reducing the intensity of said radiant energy that does not deeply penetrate food comprises a plate disposed between said radiant energy source and a location within said cooking chamber where food to be cooked is placed, said plate being made of infrared pass glass.

13. The radiant oven of claim 12 wherein said plate absorbs radiation having a wavelength below about 600 nm.

14. The radiant oven of claim 12 wherein said plate absorbs radiation having a wavelength below about 700 nm.

* * * * *